May 15, 1962 A. A. GOLD 3,034,242
DISPLAY BANNER ASSEMBLY
Filed May 11, 1960
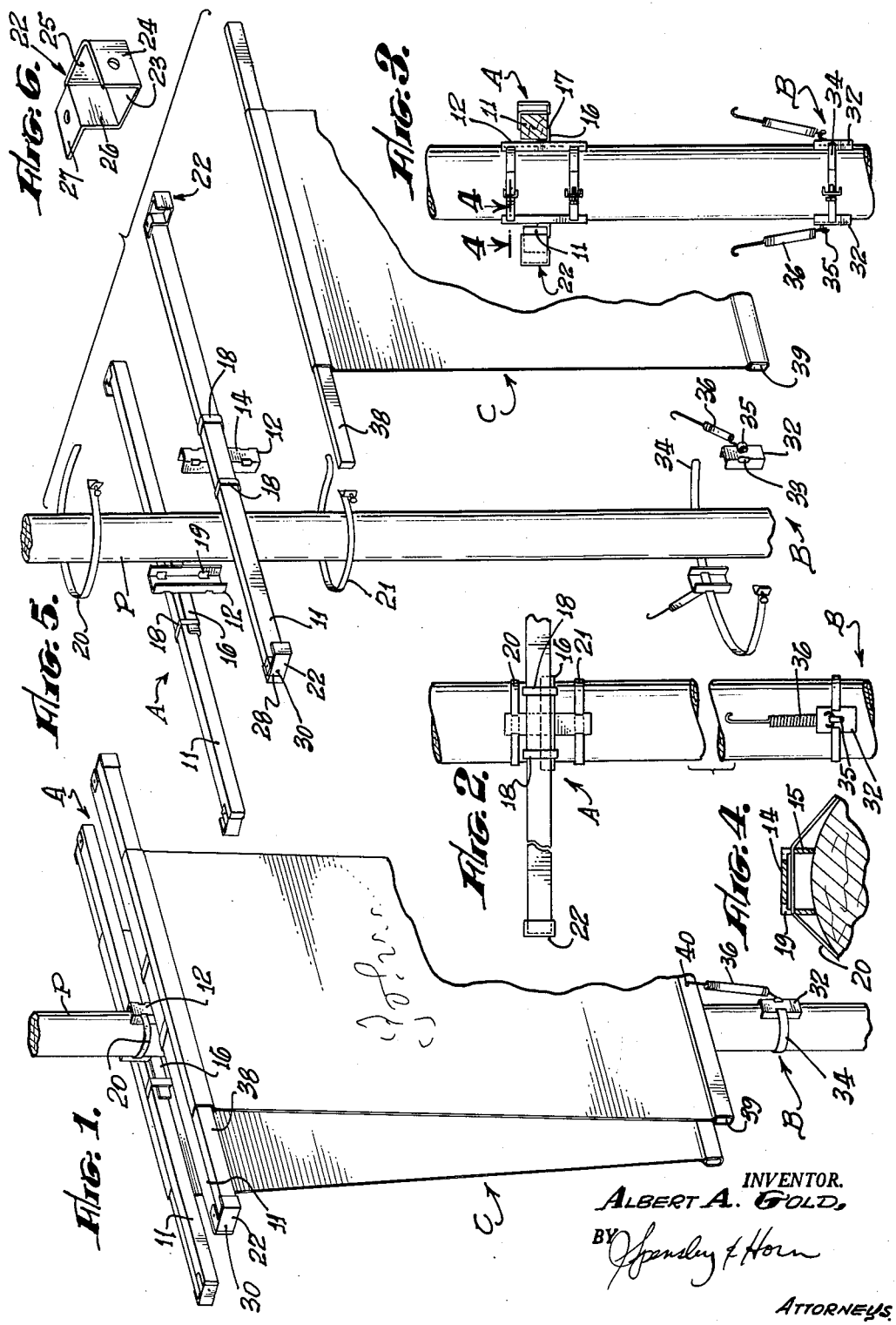
INVENTOR.
ALBERT A. GOLD,
BY
ATTORNEYS United States Patent Office 3,034,242
Patented May 15, 1962

3,034,242
DISPLAY BANNER ASSEMBLY
Albert A. Gold, 8693 Venice Blvd., Los Angeles, Calif.
Filed May 11, 1960, Ser. No. 28,354
3 Claims. (Cl. 40—125)

This invention relates to display apparatus, and more particularly to an improved apparatus for mounting a banner-type visual display upon a vertical pole.

Advertising displays which include display banners mounted at opposite sides of a vertical pole are a well-known advertising expedient which is used particularly in connection with service stations, supermarkets and the like, as an outdoor advertising means. The problems inherent in such banner displays are caused primarily by the fact that such display banners present a large surface which is subjected to wind and weather damage. In order to be satisfactory for outdoor advertising purposes it is necessary that such banner display apparatus be so constructed and arranged that the advertising banner portion thereof is easily removable from the pole mounting apparatus in order that the banner can be easily and quickly replaced with a more recent or topical banner by operators of the service stations, or employees of the supermarket, or the like. In addition, such outdoor advertising displays, being used in large quantities, must be economical and the means for installing the apparatus on the vertical pole must be simple and rugged in order that the mounting portions of the apparatus can remain on the pole after once being affixed thereto for a considerable length of time.

Accordingly, it is an object of the present invention to provide an improved apparatus for mounting display banners at opposite sides of a vertical pole, which apparatus is simple and economical to construct and which can be quickly and easily mounted upon the display pole.

It is another object of the present invention to provide such a display banner apparatus in which the display banner can be easily and quickly removed and replaced by a new banner.

Yet another object of the present invention is to provide such a display apparatus which is rugged in construction and will withstand the wind and weather conditions encountered in outdoor advertising without damage to the apparatus which remains fixed on the pole for a considerable length of time.

It is a still further object of the present invention to provide such a manner mounting apparatus which will maintain the display banners in the required orientation with respect to the pole.

The novel features which are believed to be characteristic of the present invention both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purposes of illustration and description only, and is not intended as a definition of the invention.

In the drawing:

FIGURE 1 is a view in perspective of the banner display apparatus of the present invention mounted upon a vertical pole;

FIGURE 2 is a partial front view in elevation showing the apparatus of the present invention for mounting the display banner upon the pole, but with the display banner removed therefrom;

FIGURE 3 is a side view in elevation corresponding to FIGURE 2;

FIGURE 4 is a partial sectional view taken along line 4—4 of FIGURE 3;

FIGURE 5 is an exploded view in perspective showing the various components of the apparatus of the present invention as oriented with respect to the mounting pole; and FIGURE 6 is a view in perspective of an end bracket which is mounted upon the end of the crossbar of the present apparatus.

Referring now to the drawing, the present invention includes in general an upper assembly A, which includes parallel horizontal crossbars mounted upon the vertical mounting pole, which crossbar assemblies are horizontally positioned at opposite sides of the vertical pole. A lower assembly B is affixed to the pole beneath the upper assembly and spaced therefrom with first and second display banners C extended between the upper and lower assemblies at opposite sides of the pole.

Referring now particularly to FIGURES 2, 3, 4 and 5, the first and second crossbar assemblies are similar in construction and are oppositely placed with respect to the vertical support pole. Each of the crossbar assemblies includes a structural member 11 of predetermined length, which length is sufficient to accommodate the width of the various display banners to be mounted thereon. In the presently preferred embodiment the crossbar 11 is formed of wood, and is, for example, two inches by two inches by four feet in length. Proximate the midpoint of the crossbar there is affixed thereto a pole mounting bracket 12. The pole mounting bracket is a length of U-shaped channel iron which is vertically oriented with respect to the horizontally oriented crossbar 11. The channel is affixed to the crossbar with the front surface 14 thereof adacent the bar and with the perpendicularly extending sides 15 of the channel extending away from the crossbar. The support bracket is affixed to the crossbar by means of an L-shaped channel 16 which is affixed to the front surface of the support bracket by welding or the like. The L-channel is horizontally oriented with the horizontal leg 17 extending outwardly with respect to the front face of the U-shaped support bracket. The L-channel is greater in length than the width of the support bracket and is affixed to the crossbar 11 by means of straps 18 which extend around the crossbar and around the channel 16 with the crossbar positioned in the channel 16 as shown particularly in FIGURE 3. The vertically oriented support bracket 12 is greater in length than the height of the crossbar and openings 19 are provided through the opposite sides of the U-shaped channel above and below the crossbar. The openings 19 are formed through the support bracket 12 proximate the outer face 14 thereof. Thus, the crossbar assemblies A are affixed to the support pole P by positioning the crossbars at diametrically opposed positions with respect to the pole such that the side legs 15 of the U-shaped support bracket are in contact with the support pole at diametrically opposite points thereof as shown particularly in FIGURE 4. An affixing strap 20 of a type well-known to the art, which can be formed to the desired length to surround the pole is extended through the openings 19 above the crossbars in each of the vertical support brackets and is pulled tight to firmly position the support brackets against the pole. A lower affixing strap 21 is similarly extended through the openings of the support bracket and around the support pole to tighten the support brackets against the pole beneath the crossbars.

At each end of both crossbars there is affixed to the crossbar a banner support bracket 22. Each of the support brackets are similarly formed as shown particularly in FIGURE 6. The brackets include a lower surface 23 and outer surface 24, a back surface 25 and an inner surface 26 with the inner surface being positioned at the outer face of the crossbar. There is also integrally formed on the support bracket an upper mounting surface 27 and a back mounting surface 28, all of which are perpendicular, one with the other, such that upon the square crossbar the upper mounting surface 27 is positioned on the upper surface of the crossbar 11 while the back mounting surface 28 is positioned against the end surface of the crossbar. Screws 30 or other suitable fastening means are then positioned through openings in the upper and back mounting surfaces to firmly affix the mounting bracket to each end of the crossbars. When so mounted the mounting bracket defines a pocket into which an end of the banner bar can be removably fitted. When positioned therein, the banner bar is supported against downward movement and against sideward movement by contact with the back surface of the mounting bracket.

Referring now particularly to FIGURES 2, 3 and 5, the lower assembly of the present invention includes two vertically oriented lower mounting members 32, which mounting members are again a short length of U-shaped channel iron. Openings 33 are provided through the opposite sides of the lower mounting members proximate the outer face thereof. The lower mounting members are affixed to the pole similarly to the manner in which the upper support brackets are mounted. Namely, a flexible tightening strap 34 is extended through the openings in both brackets and surrounding the pole such that the brackets can be pulled into engagement with the pole at diametrically opposite positions with respect thereto and tightened by such strap to firmly affix them in such position. Hook means 34 are formed on the outer surfaces of the lower support members extending outwardly therefrom and are adapted to engage one end of a spring hook 36.

The display banner C comprises a flexible sheet of material which is adapted to carry the advertising legend or message on the outer surface thereof. The banner is of predetermined length less than the distance between the crossbars and the lower mounting means. The banner is affixed to an upper banner support bar 38 by sewing the upper edge of the banner about the bar in engagement therewith. For example, a hem is sewn in the banner, which is formed of cloth or weather resistant paper, and the banner bar is inserted through the loop formed by the hem. The banner bar 38 is of a predetermined length substantially equal to the width of the crossbar or the distance between the opposite end surfaces of the banner mounting brackets. Thus, the banner support bar 38 is mounted as shown particularly in FIGURE 3 by lowering it into the banner support brackets 22. A similar stiffening means such as a lower banner bar 39 is affixed at the lower end of the banner and an opening 40 is provided therethrough approximately at the midpoint thereof. The hook means 36 are adapted to engage the opening through the lower banner bar. Thus, to mount a banner display in the display assembly of the present invention it is necessary only to slip the banner bar 38 carrying the display banner into the banner support brackets 22 and to engage the hook spring 36 through the opening 40 in the lower banner bar 39 to exert a downward force upon the flexible banner and maintain it in sufficient tension to position it against movement due to wind forces or weather. It should be noted that although the present invention has been shown and described only in terms of a double banner, i.e., at opposite sides of the pole, the invention is equally applicable to a display utilizing a banner at one side of the pole only. Also it is sometimes advantageous to position spacers, such as lengths of wire between the opposite ends of the lower bars 39.

Thus, the present invention provides an improved display apparatus for mounting upon a vertical support pole, which display apparatus includes an easily removable and replaceable display banner and permanently installed mounting assemblies for positioning the banner upon the pole such that it suffers a minimum amount of damage due to wind and weather conditions.

What is claimed is:

1. A display assembly for mounting a flexible banner to a vertical pole comprising in combination: a flexible banner including an elongate upper support bar along the upper edge thereof and a lower support bar along the lower edge thereof, said upper support bar being of a predetermined length greater than the length of the upper edge of said banner and defining end portions separated by a central portion, the upper edge of said banner being disposed along the central portion of said upper support bar with the end portions of said upper support bar projecting therebeyond; a substantially rigid crossbar transversely affixed to said vertical pole, said crossbar including at each end thereof a banner support bracket adapted to receptively engage an end portion of said upper support bar on said banner, said banner support brackets projecting from said crossbar in spaced horizontal alignment and separated by substantially said predetermined distance, the end portions of said upper support bar being detachably engaged by said support brackets whereby said banner is dependent from said crossbar; and spring means affixing the lower support bar of said banner to said pole, said spring means exerting a downward force on said lower support bar to maintain said banner in tension.

2. A display assembly for mounting a flexible banner to a vertical pole comprising in combination: a flexible banner including an elongate upper support bar along the upper edge thereof and a lower support bar along the lower edge thereof, said upper support bar being of a predetermined length greater than the length of the upper edge of said banner and defining end portions separated by a central portion, the upper edge of said banner being disposed along the central portion of said upper support bar with the end portions of said upper support bar projecting therebeyond; a substantially rigid crossbar transversely affixed to said vertical pole, said crossbar including at each end thereof an angular support bracket defining a recess therein extending downwardly from the top thereof and laterally from an end thereof for receptive engagement of an end portion of said upper support bar, said angular support brackets projecting from said crossbar in spaced horizontal alignment with their recessed ends facing inwardly and separated by substantially said predetermined distance, the end portions of said upper support bar being supportively engaged by the recess in said support bracket whereby said banner is dependent from said crossbar; and spring means affixing the lower support bar of said banner to said pole, said spring means exerting a downward force on said lower support bar to maintain said banner in tension.

3. A display assembly for mounting two flexible banners to a vertical pole at opposite sides thereof comprising in combination: first and second flexible banners, each of said banners including an elongate upper support bar along the upper edge thereof and a lower support bar along the lower edge thereof, each of said upper support bars being of a predetermined length greater than the length of the upper edge of the respective banner and defining end portions separated by a central portion, the upper edge of each banner being disposed along the central portion of the respective upper support bar with the end portions of said upper support bar projecting therebeyond; first and second substantially rigid crossbars transversely affixed to said vertical pole at opposite sides thereof, each of said crossbars including at each end thereof an angular support bracket defining a recess therein extending downwardly from the top thereof and laterally from an end thereof for receptive engagement of an end portion of said upper support bars, said support brackets projecting from the respective crossbars in spaced horizontal alignment with their recessed ends facing inwardly and separated by substantially said predetermined distance, the end portions of the upper support bar of said first banner being supportively disposed within the recesses of the support brackets on said first crossbar and the end portions of the upper support bar of said second banner being supportively disposed within the recesses of the support brackets on said second crossbar whereby said first banner is dependent from said first crossbar and said second banner is dependent from said second crossbar; and spring means affixing the lower support bar of said first banner to said pole and affixing the lower support bar of said second banner to said pole, said spring means exerting a downward force on each of said lower support bars to maintain said banners in tension.

References Cited in the file of this patent

UNITED STATES PATENTS

| | | |
|---|---|---|
| 2,068,358 | Stuebing | Jan. 19, 1937 |
| 2,533,565 | Eichelman | Dec. 12, 1950 |
| 2,893,147 | Mollet | July 7, 1959 |
| 2,960,785 | Kies | Nov. 22, 1960 |